No. 687,118.  
J. & J. A. BUTKUS.  
BOTTLE STOPPERING MACHINE.  
(Application filed Sept. 19, 1900. Renewed Aug. 7, 1901.)  
(No Model.)  
Patented Nov. 19, 1901.  
5 Sheets—Sheet 1.
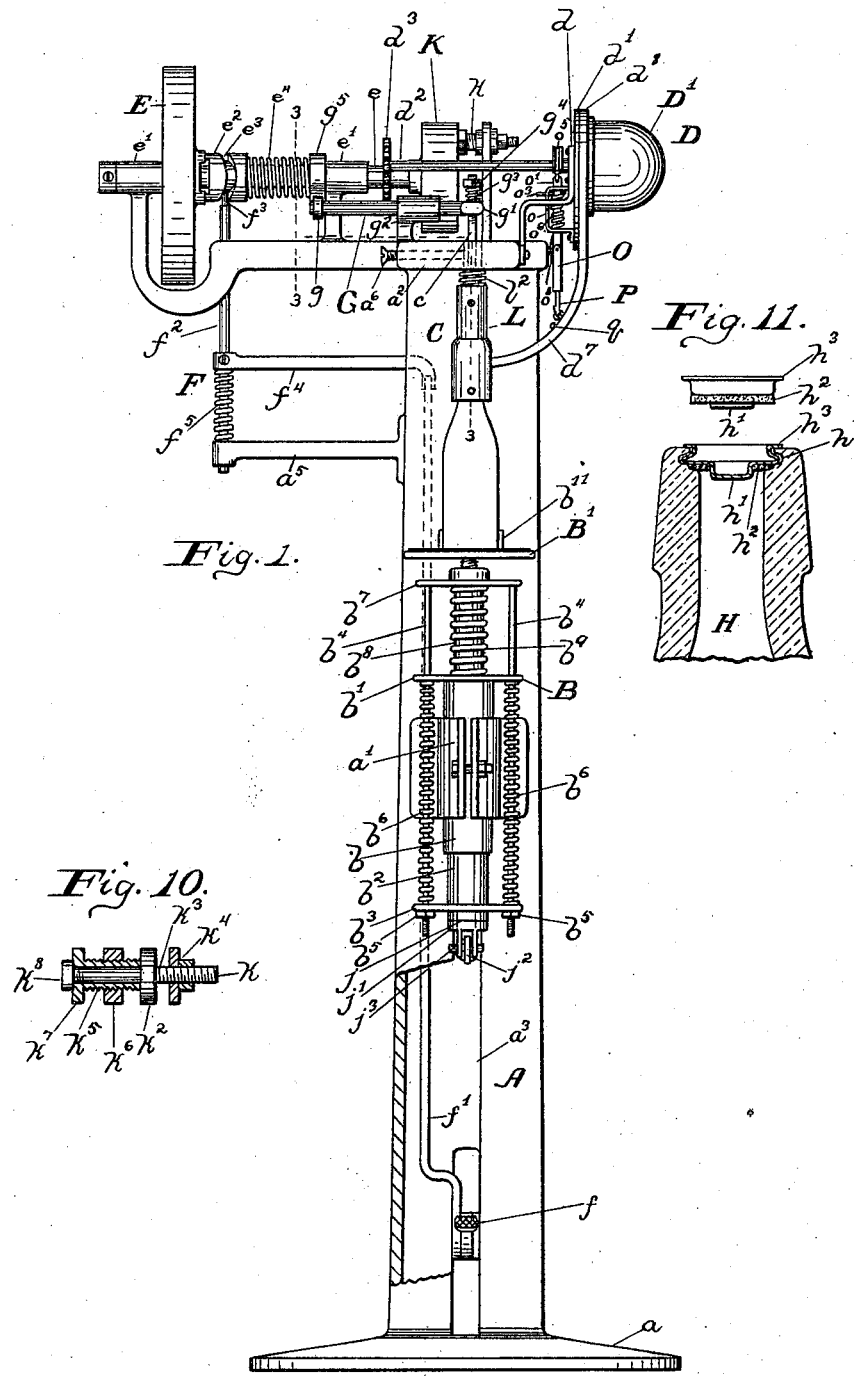

No. 687,118. Patented Nov. 19, 1901.
J. & J. A. BUTKUS.
BOTTLE STOPPERING MACHINE.
(Application filed Sept. 19, 1900. Renewed Aug. 7, 1901.)
(No Model.) 5 Sheets—Sheet 2.
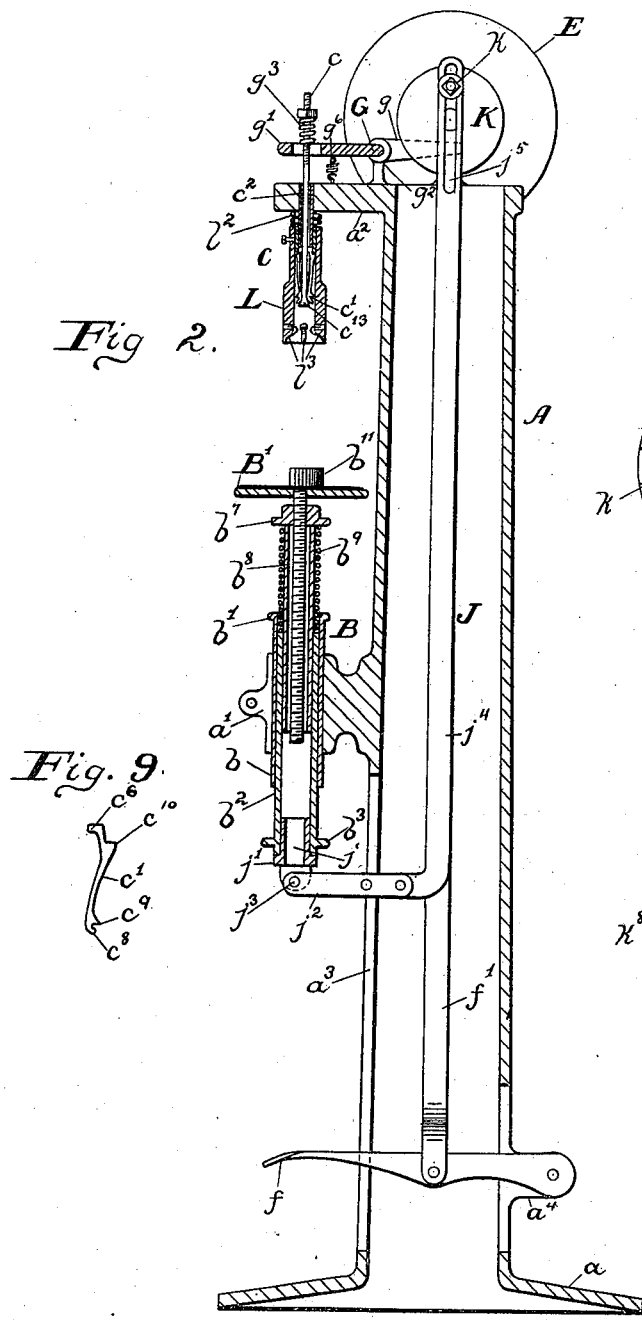
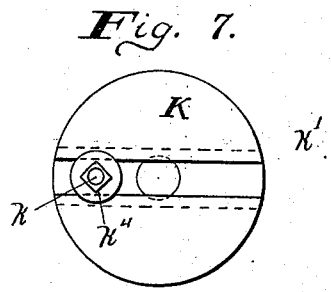
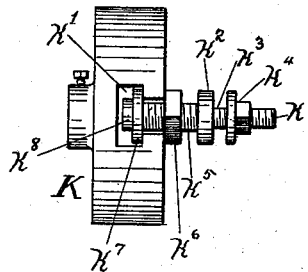
Witnesses.
Inventors.
Joseph Butkus
John A. Butkus
By Chas. B. Mann
Attorney.

No. 687,118. Patented Nov. 19, 1901.
J. & J. A. BUTKUS.
BOTTLE STOPPERING MACHINE.
(Application filed Sept. 19, 1900. Renewed Aug. 7, 1901.)
(No Model.) 5 Sheets—Sheet 3.
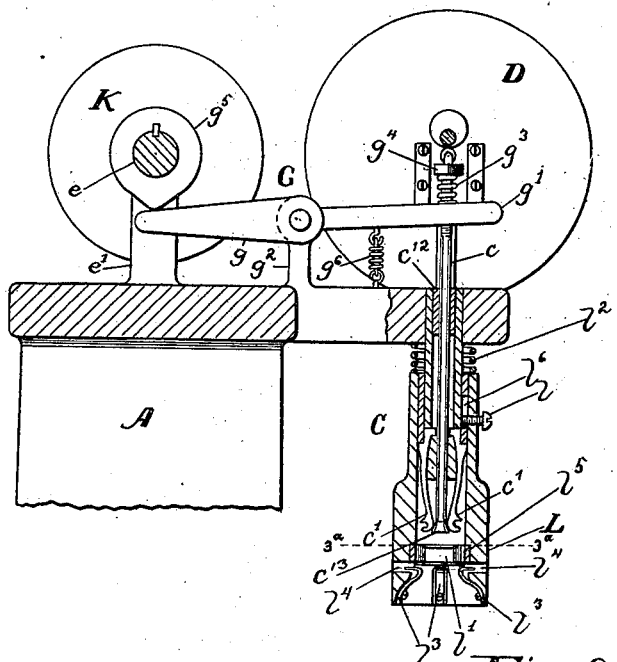
Fig. 3.
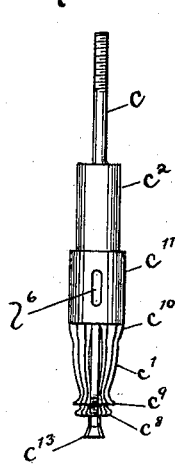
Fig. 4.
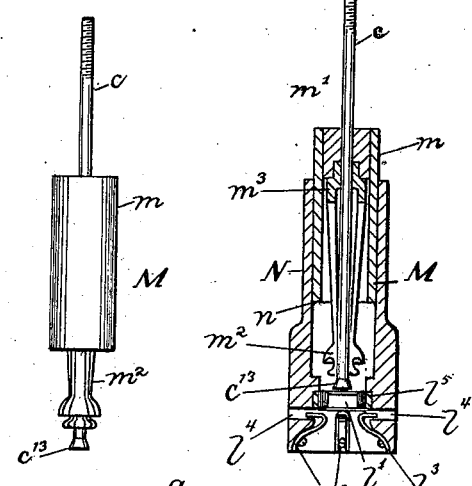
Fig. 5. Fig. 6.
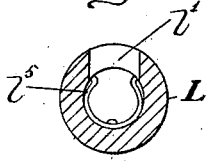
Fig. 3.ᵃ
Witnesses.
H. J. Meyer Jr.
F. S. Stitt.
Inventors.
Joseph Butkus
John A. Butkus
By Chas B. Mann
Attorney.
THE NORRIS PETERS CO., PHOTO-LITHO., WASHINGTON, D. C.

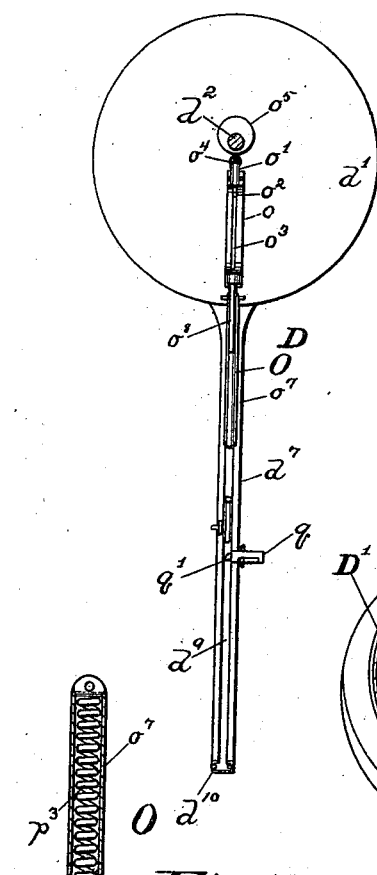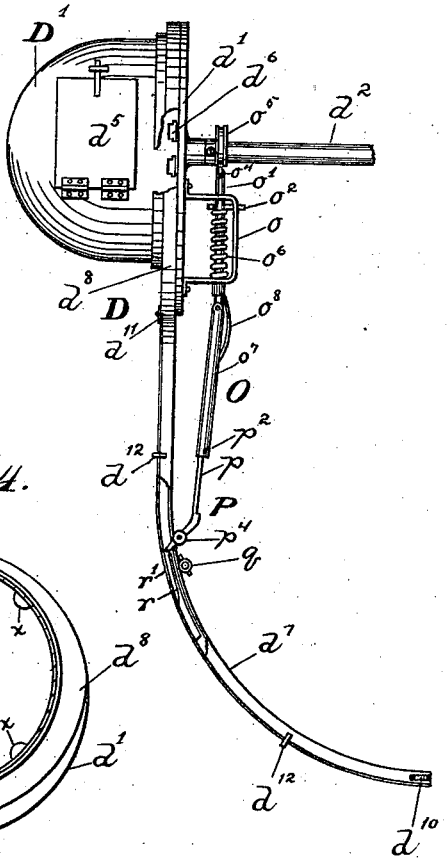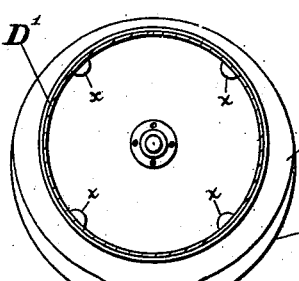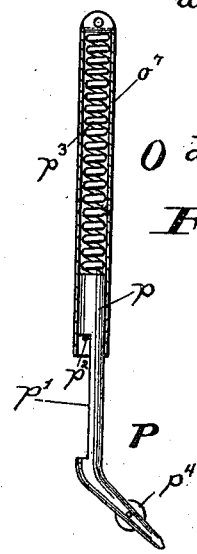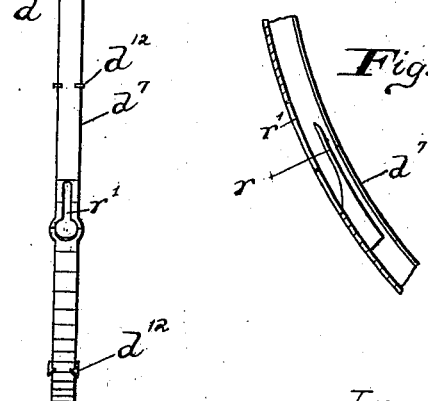

No. 687,118. Patented Nov. 19, 1901.
J. & J. A. BUTKUS.
BOTTLE STOPPERING MACHINE.
(Application filed Sept. 19, 1900. Renewed Aug. 7, 1901.)
(No Model.) 5 Sheets—Sheet 5.

Witnesses.
H. J. Meyer, jr.
F. S. Stitt.

Inventors.
Joseph Butkus
John A. Butkus
By Chas. B. Mann
Attorney.

UNITED STATES PATENT OFFICE.

JOSEPH BUTKUS AND JOHN A. BUTKUS, OF BALTIMORE, MARYLAND.

BOTTLE-STOPPERING MACHINE.

SPECIFICATION forming part of Letters Patent No. 687,118, dated November 19, 1901.

Application filed September 19, 1900. Renewed August 7, 1901. Serial No. 71,171. (No model.)

*To all whom it may concern:*

Be it known that we, JOSEPH BUTKUS and JOHN A. BUTKUS, citizens of the United States, residing at Baltimore, in the State of Maryland, have invented certain new and useful Improvements in Bottle-Stoppering Machines, of which the following is a specification.

Our invention relates to machines for inserting and fastening stoppers in bottles; and one of its objects is to provide a machine of this character which will fasten a cup-shaped metal stopper in a bottle-neck by first forcing the stopper to its seat and then expanding the side walls thereof into an interior annular groove formed in the bottle-neck just below the upper edge of the same. In placing the stopper in position the collar, of cork or other material, is compressed, and then the metal stopper is expanded.

A further object of the invention is to provide feed devices combined with the stoppering-machine which will positively feed the stoppers one at a time into position to be acted upon by the stoppering mechanism.

Reference is to be had to the accompanying drawings, in which—

Figure 17:
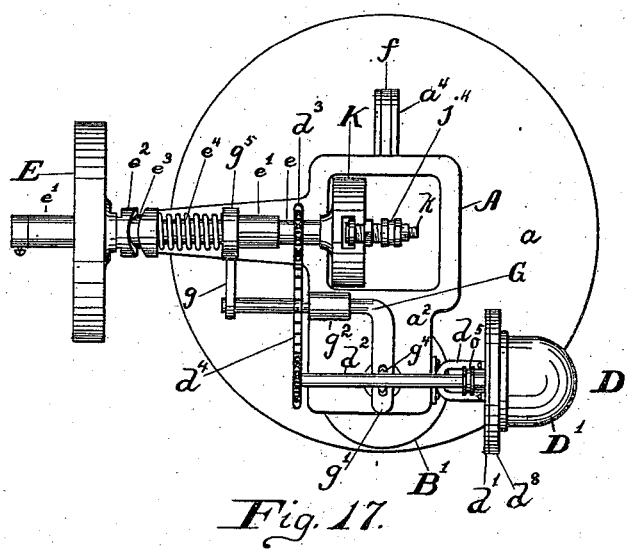
Figure 18:
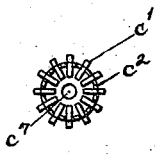
Figure 19:
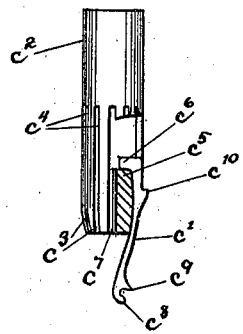

Figure 1 is a front elevation of our improved bottle-stoppering machine. Fig. 2 is a vertical transverse section thereof, taken at right angles to Fig. 1. Fig. 3 is an enlarged vertical transverse section of the upper portion of the machine, taken approximately on the line 3 3 of Fig. 1 and looking from the left of said figure. Fig. $3^a$ is a section on line $3^a$ $3^a$ of Fig. 3. Fig. 4 is a detail elevation of the stopper-expanding devices. Fig. 5 is a detail elevation of a modified form of expanding devices. Fig. 6 is a detail sectional view of said modified form of expanding devices with a stopper-holding and bottle-guiding sleeve connected therewith and shown in section. Fig. 7 is a detail side view of the wheel for raising the bottle-holder. Fig. 8 is a peripheral view thereof, showing the wrist-pin which holds the rod which connects said wheel with the bottle-holder. Fig. 9 is a detail view of one form of expanding-finger shown detached. Fig. 10 is a detail view of the wrist-pin shown in Fig. 8. Fig. 11 is a sectional view of the upper portion of a bottle-neck with a stopper expanded therein and also a view of a stopper before it has been expanded. Fig. 12 is a front elevation of the stopper-feeding devices. Fig. 13 is a side elevation thereof. Fig. 14 is a rear elevation of the same with the stopper-receptacle in section. Fig. 15 is a detail view illustrating the pusher-foot for feeding the stoppers one at a time to the stoppering devices. Fig. 16 is a detail view of a portion of the delivery-chute of the feed devices. Fig. 17 is a top plan view of the entire machine. Fig. 18 is a horizontal sectional view of the supporting-tube for the expanding-fingers, showing the said fingers in place. Fig. 19 is a side elevation thereof with all the fingers but one removed and with part broken away to show the manner of attaching the finger.

We will first describe the general arrangement and operation of our bottle-stoppering machine and then specifically set forth the details of construction, pointing out the novel features and combinations of parts in the appended claims.

The machine is provided with a tubular or hollow vertical standard A, mounted upon a suitable base $a$. About midway of its height said standard is provided with a split yoke-clamp $a'$, in which is adjustably secured the tubular stem $b$ of a bottle-holder B, and at its upper end said standard is provided with a forwardly-projecting ledge $a^2$, from which depend the stoppering devices C, the latter being at a suitable distance above and in vertical alinement with the said bottle-holder B.

D designates the feed device for positively feeding the stoppers one at a time to the stoppering devices C and is suitably clamped on the side of the forwardly-projecting ledge $a^2$.

E designates a continuously-rotating pulley loosely mounted on a horizontal shaft $e$. Said shaft is mounted in bearings $e'$ on the top of the standard A and is made fast with the said pulley E through the medium of a spring-actuated clutch $e^2$. A releasing device F is normally in engagement with said clutch and is operated from a foot-treadle $f$, fulcrumed at the base of the standard A. When the said treadle is depressed, the clutch $e^2$ engages the pulley, which causes the shaft $e$ to rotate with the pulley E. This rotation, through suitable means hereinafter described, causes the bottle-holder B to rise, so as to cause the mouth of a bottle placed thereon to be brought into position for action by the stoppering devices. A further rotation of said shaft by means of a cam $g^5$ depresses the rear arm $g$ of a rocking lever G, the forward arm $g'$ of which is connected to a wedge-pin $c$, which has a wedge action on the inside of expanding-fingers $c'$, and said fingers expand the side walls of the metal stopper into an annular groove $h$ in the neck of the bottle H, as indicated in Fig. 11. A still further rotation of the shaft $e$ permits the expanding-fingers to contract from the stopper and lowers the bottle-holder B and bottle away from the stoppering devices in position for the holder to receive another bottle.

*The bottle-holder.*—Secured at a predetermined vertical adjustment within the split clamp $a'$ on the front of the standard A is a vertical tubular stem $b$, open at both ends and provided at its top with a rigid cross-arm $b'$, as shown in Fig. 1. A sleeve $b^2$ is fitted to slide within said tube and is provided near its lower end with a rigidly-secured cross-arm $b^3$, in alinement with the said upper cross-arm $b'$. Vertical guide-rods $b^4$ slide through apertures in the ends of the cross-arms $b'$ and $b^3$, the lower ends of said rods being threaded and provided with nuts $b^5$, which act as stops to limit the upward movement of said rods, and a spring $b^6$ is coiled around each guide-rod between the said upper immovable cross-arm and the lower movable cross-arm, against which they bear to press the said guide-rods and sleeve downwardly. The upper ends of said guide-rods $b^4$ are connected by a cross-head $b^7$. A tube $b^8$ is rigidly secured to and depends from said cross-head and slides within the upper end of the sleeve $b^2$. The cross-head $b^7$ has a threaded aperture and the bottle-holding disk B' has a threaded rod which enters said aperture, and a spring $b^9$ is coiled exteriorly around the said tube $b^8$ and bears against the lower side of said cross-head and the upper edge of the said sleeve $b^2$, whereby to yieldingly support the bottle-holding disk. The upper face of the disk B' is preferably cushioned with a rubber pad and has a V-shaped guide $b^{11}$ in order to properly center the bottle. The actuating mechanism J for raising the bottle-holder B so as to bring the mouth of the bottle H in proper relation to the stoppering devices is provided with a bushing $j$, fitting within the lower end of the sleeve $b^2$ and having an exterior flange $j'$ engaging the lower edge of said sleeve. A vertically-reciprocating rod $j^4$ is within the standard A, and has at its lower end a lateral arm $j^2$, which projects through a vertical slot $a^3$ in the standard, and the end of said arm is connected with the bushing $j$ by a pivot $j^3$. The upper end of said reciprocating rod $j^4$ has a longitudinally-extending slot $j^5$, which is adjustably attached to a wrist-pin $k$, which in turn is adjustably mounted in a diametrical undercut groove $k'$, formed on a wheel K, fixedly mounted on the horizontal shaft $e$, and when said shaft turns it is evident that the sleeve $b^2$ of the bottle-holder will be slid up and down in the tube $b$. Figs. 1, 2, 8, and 10 show the means for adjustably connecting the rod $j^4$ to the wheel K and for regulating the stroke of said rod. It will be seen that the wrist-pin $k$ is provided intermediate of its ends with a fixedly-secured or integral collar $k^2$. On one side of said collar said wrist-pin is threaded, as shown at $k^3$. This threaded end is inserted through the slot $j^5$ in the rod $j^4$ and is secured at any desired point therein by a nut and washer $k^4$. Now when it is desired to make any change in the elevation of the bottle-holder B as a whole the tube $b$ is adjusted vertically in the split clamp $a'$, and the connecting-rod $j^4$ is then relatively adjusted on the wrist-pin $k$. On the other side of said collar $k^2$ the wrist-pin $k$ has an exteriorly-threaded sleeve $k^5$, on which a nut $k^6$ has previously been screwed. Said sleeve has an annular head $k^7$, which has position in the undercut groove $k'$, and a nut $k^8$ is screwed on the end of the wrist-pin $k$ and against the annular head to hold said sleeve thereon, as plainly indicated in Figs. 8 and 10. The stroke of the reciprocating rod $j^4$ is regulated by the distance the wrist-pin $k$ is from the axis of the wheel K, and when the wrist-pin has been adjusted the nut $k^6$ is screwed tightly against the outer face of said wheel to hold it.

The operation of the bottle-holder B is as follows: After the operator has placed a bottle H in the V-shaped guide $b^{11}$ on the disk B' his foot depresses the treadle $f$, and thereupon the clutch $e^2$ will couple the shaft $e$ with the continuously-rotating pulley E. The rotation of such shaft turns the wheel K, which acts on the reciprocating rod $j^4$ and causes it to raise the movable parts of the bottle-holder, so that the mouth of the bottle will be in proper position to receive the stopper. All slight vertical adjustment of the bottle-holder disk B' is effected by rotating said disk; but if any great adjustment is required we prefer to move the tube $b$ up or down in the split clamp $a'$.

The clutch-releasing mechanism F, hereinbefore referred to, comprises, specifically, a bracket-arm $a^5$, projecting laterally from that side of the standard A adjacent the pulley E. A rod $f^2$ is fitted to slide vertically in the outer end of said bracket-arm and is provided at its upper end with a pin $f^3$, which normally enters a cam-groove $e^3$ in the cam $e^2$, and a horizontal arm $f^4$ is rigidly secured to the rod $f^2$ intermediate of its ends and is also secured to the upper end of the vertical bar $f'$, located within the standard. The lower end of said vertical bar $f'$ is pivoted to the treadle $f$, which latter is fulcrumed between ears $a^4$ on the standard A and projects out through the slot $a^3$ in the standard. A spring $f^5$ is coiled around the rod $f^2$ between the bracket-arm $a^5$ and horizontal arm $f^4$, so that when the treadle is released from a depressed position the spring will raise the rod and will cause the pin $f^3$ to enter the cam-groove $e^3$ in the clutch and move the latter out of engagement with the pulley E against the tension of the clutch-spring $e^4$.

*The stopper-expanding devices.*—The stopper-expanding devices C are located directly above the bottle-holder B and are provided with a tube $c^2$, secured vertically in the ledge $a^2$ of the standard A by means of a horizontal binding-screw $a^6$. This tube $c^2$ is the support or carrier for the expanding-fingers $c'$, and to this end (see Figs. 18 and 19) is provided on its exterior with a series of radial longitudinal grooves and slots. These grooves $c^3$ commence at the lower end of said tube, but do not penetrate to the bore of the tube. Their upper ends, however, do penetrate to the bore of the tube, and therefore constitute slots $c^4$. Commencing at the upper end and extending down to about two-thirds of the distance the tube is bored out to form a larger caliber than the lower end, or one-third of the tube. By having a smaller bore at the lower end an annular shoulder $c^5$ is formed at the point where the slots and grooves join. Each groove and slot contains an expanding-finger $c'$, and each of these preferably comprises a piece of spring-steel provided at its upper end with an inwardly-extending lug $c^6$, which projects into the slot $c^4$ and overhangs upon the annular shoulder $c^5$. From said lug $c^6$ each finger extends downwardly in a groove $c^3$ and is bent inwardly, so that its lower end will project into alinement with the reduced bore $c^7$ at the lower end of the tube $c^2$. Lower and upper expanding-teeth $c^8$ and $c^9$ are formed on the outer side of the said lower end of each finger. A shoulder $c^{10}$ is formed on the outer side of each finger, near the upper end thereof, and a collar $c^{11}$ is fitted tightly around the tube $c^2$, as shown particularly in Fig. 4, and bears down upon the shoulders $c^{10}$ of the several fingers, whereby to fasten the fingers in place. A pin $c$, with a wedge-shaped head, is fitted to slide through the reduced bore $c^7$ of the tube between the lower ends of the expanding-fingers and also through a bushing $c^{12}$ in the upper end of said tube. The wedge-shaped head $c^{13}$ is normally below the lower ends of the expanding-fingers, as in Fig. 4. When said pin is raised, this head acts as a wedge against the lower ends of the expanding-fingers $c'$ and causes the latter to move outwardly, as indicated in Fig. 3, to expand the stopper into the groove $h$ in the bottle-mouth. G designates the mechanism for raising the said wedge-pin $c$, and comprises, as shown best in Figs. 2, 3, and 17, a two-armed rocking lever fulcrumed on a bearing $g^2$ on the top of the standard A. One arm $g'$ of the said lever extends forwardly over the ledge $a^3$ and is provided with an aperture at its outer end through which the upper end of the wedge-pin $c$ extends. A spring $g^3$ is coiled around said pin $c$ above said arm $g'$, which in case of any deviation in the regular diametrical size of the neck of the bottle to be sealed acts after a certain amount of pressure has been exerted on said pin by the bottle-holder in such a way as to check the pressure of the wedge-shaped head on the expanding-fingers, thereby avoiding their expansion to too great an extent and preventing the fingers from breaking the bottle by excessive pressure on the stopper. A nut $g^4$ screws on the extremity of said pin above the spring for the purpose of adjusting and regulating the same. The other arm $g$ of said lever extends rearwardly into engagement with a cam $g^5$, secured on the horizontal shaft $e$, so that as said shaft rotates the said cam will rock said lever and raise the wedge-pin to expand the fingers. A spring $g^6$ pulls down upon the forward arm $g'$ of said rocking lever and keeps the rear arm $g$ thereof always in engagement with said cam.

In order to hold a stopper in position to go into the mouth of a bottle upon the rise of the bottle-holder B and also in order to guide the mouth of the bottle into position to receive the said stopper, we have provided a cylinder L, which fits around and reciprocates vertically upon the collar $c^{11}$ of the stoppering devices C, said collar being provided with a vertical groove, in which the end of a pin or screw $l$, inserted through said cylinder, works, whereby to guide the cylinder in a true vertical plane while reciprocating and prevent its rotation. The said cylinder L near its lower end is provided with a side opening $l'$ to receive the stoppers one at a time and which registers with the discharge end of the chute $d^7$ of the stopper-feeding devices D when the cylinder is at the downward limit of its movement, and a coil-spring $l^2$ presses the cylinder down. The stoppers are fed by feed devices, hereinafter described, and after a stopper passes through the opening $l'$ to the interior of the cylinder it rests upon the free ends of springs $l^3$, secured to the inside of the cylinder at the lower edge thereof, as seen best in Figs. 3 and 6. When said springs are pressed apart by the bottle-mouth, their free ends move outwardly in lateral slots $l^4$.

In operation the bottle-holder raises the bottle and the bottle-mouth enters the lower end of the cylinder L and presses the springs $l^3$ apart, whereupon the metal stopper will drop into the bottle-mouth. The further raising of the bottle causes the cylinder L to be raised until the upper surface of the metal stopper comes against the wedge-shaped head $c^{13}$ of the pin $c$, the pressure of which seats the stopper to its position in the bottle-mouth. The still further raising of the bottle brings the stopper against the ends of the fingers $c'$, which by resisting the upward movement causes the cork attached to the metal stopper to be compressed on its seat before the fingers are expanded, and then the wedge-shaped head of the pin $c'$ is forced between the fingers and causes them to spread or expand against the metal sides of the stopper and forces the metal thereof into the groove in the mouth of the bottle. When the bottle-holder is again lowered, the spring $l^2$ will press the cylinder L downwardly, so as to bring the side opening $l'$ in register with the chute $d^7$ to receive another stopper from the feeding devices. The feeding devices D pass the stoppers into the side opening of the cylinder with a spring or "spitting" action, and to prevent a stopper from rebounding out of the side opening $l'$ we have provided a spring-clip $l^5$ inside the cylinder, as shown in Figs. 3 and 3ª, which opens to receive the stopper and then holds it centrally within the cylinder upon the free ends of the springs $l^3$.

In Figs. 5 and 6 a modification of the expanding devices is illustrated in which the expanding devices M comprise a tube $m$, adapted to be secured in and depend from the ledge $a^2$ of the standard A. A bushing $m'$ fits tightly within the top of said tube $m$, and all the expanding-fingers $m^2$ are integrally connected at their upper ends by a head $m^3$, which fits tightly in the under side of the bushing $m'$. N designates the stopper-holding and bottle-guiding cylinder in this modification, and its upper end is bored out, as at $n$, to receive the lower part of tube $m$.

*The stopper-feeding devices.*—Referring to Fig. 1 and to Figs. 12 to 17, inclusive, D designates the devices for holding a supply of stoppers and positively feeding one stopper at a time through the opening $l'$ into the cylinder L. A bracket $d$ is clamped to the right-hand side of the ledge $a^2$ and at its upper end is secured a circular flat plate $d'$. A horizontal rotary shaft $d^2$ is mounted in suitable bearings and extends through said plate and derives its motion from the shaft $e$, by means of sprocket-wheels $d^3$ and chain $d^4$, as shown in Fig. 17. The said shaft $d^2$ at one end carries a rotary semispherical receptacle D', having a door $d^5$, through which a quantity of stoppers are inserted into the receptacle, and the latter is provided at its circular rim with outlet-openings $d^6$, which are "stopper-shaped"—that is, are of a contour corresponding to the cross-section of the stoppers used—and said openings are so positioned that a stopper can only pass therethrough into the delivery-chute $d^7$ when the stopper is right side up, as is evident by reference to Fig. 13, where two of the openings are shown. The rotary receptacle is provided on its interior with lugs $x$, (see Fig. 14,) against which the stoppers strike when the receptacle turns, thus causing them to tumble. The chute $d^7$ is provided at its upper end with a ring $d^8$, which entirely encircles and is spaced from the stopper-receptacle B' around the openings, and the lower end of the chute curves toward the stoppering devices C and terminates at the cylinder L. As the ring $d^8$ entirely encircles the stopper-receptacle, it causes all the stoppers to enter the chute, no matter at what point they may be thrown out of the stopper-receptacle. In case a stopper sticks in an outlet-opening $d^6$ the space between the ring and receptacle allows the stopper to be carried all the way around, and the ring is of such a width on its lower side that two stoppers can pass edge to edge, so that the stoppers will not crush each other. A hanger $o$ is secured to a face of the circular plate $d'$. A rod $o'$ reciprocates vertically through said hanger and is guided in a true vertical plane by means of a pin $o^2$ working in a slot $o^3$ in the hanger, and a roller $o^4$ is journaled in the upper end of said rod and rides upon a cam $o^5$ on the rotary shaft $d^2$. A spring $o^6$ is coiled around said rod $o'$ and bears against the hanger $o$ and pin $o^2$, whereby to press the rod upwardly, so that the roller $o^4$ will always be in contact with the cam $o^5$. The lower end of the rod $o'$ carries the pusher-foot O for positively pushing the metal bottle-stoppers one at a time out of the delivery-chute. Said foot comprises a tube $o^7$, pivotally connected to the lower end of the rod $o'$ and in which is slidably fitted the shank $p$ of a toe P, said shank being recessed, as at $p'$, and a pin $p^2$ being secured in the lower end of said tube and fitting in said recess, whereby to prevent the rotation of the toe. An expansion-spring $p^3$ is located in the tube $o^7$ above the toe P and presses downwardly on the latter, allowing said toe to yield in case the chute becomes clogged up, so that the toe will not at such time punch holes in the stoppers. The lower end of the toe P is angularly disposed to its shank $p$ and is provided with a roller $p^4$, which rides on the front or inner side of the chute $d^7$, as shown in Figs. 12 and 13, and guides the toe in a slot $d^9$, which is on the inner side of the chute. The roller $p^4$ prevents the end of the toe P from entering too far into the chute and pressing too hard upon the stoppers. A spring-pressed abutment $q$ is secured to the chute and is provided with a finger $q'$, extending across the slot $d^9$, and the outer end of the said finger is beveled at the upper side. As the shaft $d^2$ rotates the receptacle which it carries will discharge stoppers into the chute $d^7$ in proper position, and said stoppers will fill said chute and are prevented from discharging before the proper time by means of small leaf-springs $d^{10}$ at the discharge-mouth of the chute. At the same time the cam $o^5$ on the shaft $d^2$ will move the rod $o'$ and pusher-foot O downwardly, and the toe P of said foot working in the slot $d^9$ will engage with a stopper and push the column of stoppers down so that one stopper will press apart the discharge-springs $d^{10}$ and enter the side opening $l'$ in the cylinder L. As the toe P moves downwardly it engages with the beveled end of the abutment-finger $q'$ and presses said finger back; but as soon as the toe passes the said finger the latter will spring forward again and cause the toe to disengage from the stopper and to ride up rearwardly over the finger, when a further rotation of the shaft $d^2$ permits the rod $o'$ and pusher-foot O to move upwardly again, and the spring $o^8$, bearing against the pusher-foot, presses the toe again into the slot.

The specific form of metal stopper shown in Fig. 11 is cup-shaped and is provided with a central boss $h'$, around which is fitted a collar $h^2$, of cork or the like, which seals the joint between the stopper and bottle and makes the same tight, and the metal stopper is also provided at its top with an outwardly-flared rim $h^3$, which fits down on the upper edge of the bottle-mouth, and the walls of the metal cup below the said outwardly-flared rim are expanded into an annular groove in the bottle-mouth. These cork collars sometimes become detached from the cup part, and in order to prevent a stopper that is without a collar from passing to the stoppering devices we have provided the delivery-chute with a shunt device comprising two rails $r$, secured one at each side of the slot on the interior of the chute immediately below the lowest point of travel of the toe P, and a keyhole-shaped slot $r'$ on the rear side of the chute adjacent said rails. The rails $r$ of the shunt device are located a distance from the rear side of the chute a little less than the entire height of a bottle-stopper of the kind just described. The narrow upper end of the keyhole-slot $r'$ is of a width a little greater than the diameter of the boss $h'$ on the stopper and is higher up on the chute than the upper ends of the shunt-rails $r$, and the diameter of the large lower end of the keyhole-slot is slightly greater than the maximum diameter of the stopper. Now should it happen that a stopper that is without a cork collar is pushed down the chute its boss $h'$ will enter the upper end of the slot $r'$, and the top rim $h^3$ will slide along underneath the rails $r$ until the stopper comes to the large lower end of the slot, when it will discharge into a suitable receptacle designed to catch it; but all stoppers provided with cork collars will pass over the keyhole-shaped slot, as the cork collars will insure that the outwardly-flared rims $h^3$ ride upon the rails $r$, which action will carry the stoppers over the slot $r'$. The rear side or bottom of the chute $d^7$ is hinged to the front or upper part of the chute, as shown at $d^{11}$, Fig. 14, and is held closed by means of spring-catches $d^{12}$, so that the chute may be opened in case it should clog up.

In the description of the practical operation of our machine we will consider that a stopper has already been deposited by the feed devices D into the cylinder L and that the bottle-holder B is at the lowermost limit of its vertically-reciprocating movement. The operator places the bottle H on the disk B' and depresses the treadle $f$ with his foot, thereupon causing the vertical bar $f$ and its horizontal arm $f^1$ to pull down the rod $f^2$, which frees its pin $f^3$ from engagement with the clutch and permits the latter to engage the continuously-rotating pulley E. The horizontal shaft $e$ will then begin to rotate, which will turn the wheel K so as to pull the reciprocating rod $j^4$ upwardly, and the latter will raise the bottle-holder B. When the bottle-holder rises with a bottle on it, its upward movement will cause the compression of the cork collar on its seat in the bottle-mouth when the stopper contacts with the expanding-fingers. The expanding-fingers are then spread by the wedge-shaped head $c^{13}$, and thereby the metal sides of the stopper are then forced into the annular groove $h$ of the bottle-mouth. The continued rotation of the shaft $e$ will have the effect of allowing the expanding-fingers to contract and free themselves from the expanded stopper, and immediately the bottle and bottle-holder will commence to descend. The cylinder L also descends, and the opening in its side is brought into registry with the discharge-mouth of the stopper-delivery chute. The parts of the stopper-feeding device are so timed with respect to the movements of the cylinder L that the pusher-foot O will move downwardly just at the time when the side opening of the cylinder has come into registry with the discharge-mouth of the delivery-chute.

While the accompanying drawings show one form of our invention, it is evident that changes in the details of construction and arrangement of the parts may be made without departing from the scope of the invention, which is defined in the appended claims.

Having thus described our invention, what we claim as new, and desire to secure by Letters Patent, is—

1. In a bottle-stoppering machine, the combination of a vertically-reciprocable bottle-holder; stopper-expanding devices thereabove; a vertically-reciprocable cylinder mounted to slide on said expanding devices and provided with stopper-holding devices; and means for raising said bottle-holder whereby a bottle thereon will engage with and raise said cylinder to bring the bottle-mouth and the stopper into position for action by the expanding devices.

2. In a bottle-stoppering machine, the combination of a vertically-reciprocable yielding bottle-holder; stopper-expanding devices thereabove; a cylinder mounted to slide on said expanding devices and provided with stopper-holding devices; means for raising said bottle-holder; and a feed device adapted to positively feed stoppers one at a time into said stopper-holder.

3. In a bottle-stoppering machine, the combination with a standard, of a bottle-holder mounted thereon; stopper-expanding devices also mounted thereon above said bottle-holder; a rotatable shaft journaled on said standard and provided with a wheel, K; and a vertical reciprocating rod secured to said wheel and also to said bottle-holder whereby to reciprocate the latter vertically and move it toward and from the expanding devices.

4. In a bottle-stoppering machine, the combination with a standard, of a vertically-reciprocable bottle-holder mounted thereon;

stopper-expanding devices also mounted thereon above said bottle-holder; a rotatable shaft journaled on said standard and provided with a wheel, K, having a groove in one face; a vertical rod in the standard and connected at its lower end with the bottle-holder; and a wrist-pin adjustably held in the groove of the wheel, K, and secured to the upper end of said rod.

5. In a bottle-stoppering machine, the combination with a standard provided at one side with a clamp, of a vertically-reciprocable bottle-holder adjustably secured in said clamp; stopper-expanding devices mounted on said standard above said bottle-holder; a rotatable shaft journaled on said standard and provided with a wheel, K, having a groove in one face; a vertical rod connected at its lower end to said bottle-holder and provided at its upper end with a longitudinal slot; and a wrist-pin adjustably held in the groove of the wheel, K, and also adjustably fitted in the slot of said rod.

6. In a bottle-stoppering machine, the combination with a standard, of a bottle-holder mounted thereon; stopper-expanding devices also mounted thereon above said bottle-holder, and provided with expanding-fingers and a wedge-pin adapted to spread said fingers apart; a rocking lever fulcrumed on said standard and provided with two arms, one of which is connected to said wedge-pin, and a rotatable shaft journaled on said standard and provided with a cam adapted to engage the other arm of said lever whereby to rock the latter.

7. In a bottle-stoppering machine, the combination with a standard, of a bottle-holder comprising a vertically-extending tube, $b$, adjustably secured to said standard; a sleeve fitted to slide in said tube; means for sliding said sleeve; a tube, $b^8$, fitted within said sleeve and having a yielding connection therewith, said latter tube being provided at its upper end with a cross-head, $b^7$; and a screw-rod working through said head and carrying a disk at its upper end on which a bottle is adapted to be set.

8. In a bottle-stoppering machine, the combination with a standard, of a bottle-holder comprising a tube, $b$, adjustably secured thereto and provided at its upper end with a cross-arm; a sleeve fitted to slide in said tube and provided at its lower end with a cross-arm underneath and in alinement with the first-named cross-arm; a tube, $b^8$, fitted in said sleeve and provided at its upper end with a cross-head, $b^7$; a disk for the support of a bottle having a rod adjustably secured in said cross-head; guide-rods rigidly secured to and depending from said cross-head and extending slidably through the said upper and lower cross-arms; stops secured to the lower ends of said guide-rods below the lower cross-arm; and a spring coiled around each guide-rod, said springs bearing between the upper and lower cross-arms.

9. In a bottle-stoppering machine, an expanding device comprising a tube having a reduced bore at its lower end and a larger bore thereabove forming between them a shoulder, $c^5$, and provided at its lower end with a series of exterior longitudinal grooves whose upper ends form slots which extend entirely through the tube into the larger bore; a series of expanding-fingers fitted in said grooves and slots and each provided with a lug which overhangs said shoulder; means for fastening said fingers in the grooves; and a wedge-pin adapted to spread the lower ends of said fingers apart.

10. In a bottle-stoppering machine, an expanding device comprising a tube having an interior annular shoulder and a series of exterior longitudinal grooves; a series of expanding-fingers fitted in said grooves and each provided at its upper end with a lug which overhangs or rests upon said annular shoulder, and also provided on its outer side below said lug with a shoulder; a collar secured on said tube around the upper ends of said expanding-fingers and bearing down upon the shoulders of the latter; and a yielding wedge-pin adapted to spread the lower ends of said fingers apart.

11. In a bottle-stoppering machine, the combination of an expanding device; a cylinder slidable vertically on said expanding device and provided with a side opening through which stoppers are adapted to be passed; a stopper-feed device having a chute whose mouth is in registry with said side opening when the cylinder is in its lowered position; means for raising said cylinder so that its side opening will be above said chute-mouth; and means for automatically returning said cylinder to its lowered position.

12. In a bottle-stoppering machine the combination with a stopper-holder, of a delivery-chute whose mouth is located adjacent said holder; a rotary stopper-receptacle adapted to pass stoppers into said chute; a reciprocating pusher-foot provided with a toe working in said chute and engaging and pushing the stoppers on its forward movement; and a yielding abutment secured to said chute, over which said toe rides during the backward movement of said pusher-foot.

13. In a bottle-stoppering machine, the combination with a stopper-holder, of a delivery-chute whose mouth is located adjacent said holder; a rotary stopper-receptacle adapted to pass stoppers into said chute; a reciprocating pivoted pusher-foot provided with a yielding toe working in said chute and engaging and pushing the stoppers on its forward movement; and a spring-pressed abutment secured to said chute, over which said toe rides during the backward movement of said pusher-foot.

14. In a bottle-stoppering machine, the combination with the standard, and stopper-holder supported thereby, of a rotary stopper-receptacle mounted on said standard; a delivery-chute adapted to receive stoppers from said receptacle and whose discharge-mouth is located adjacent said stopper-holder, said chute having in its front side a longitudinal slot; springs at the discharge-mouth of said chute; and a vertically-reciprocating pusher-foot having a toe working in said slot and engaging and pushing the stoppers one at a time past said springs at the discharge-mouth of the chute on its forward movement.

15. In a bottle-stoppering machine, a stopper-feed device comprising a stopper-receptacle; a delivery-chute adapted to receive stoppers from said receptacle; a rotary shaft carrying said receptacle and provided with a cam; means for rotating said shaft; a vertically-reciprocating rod spring-pressed into engagement with said cam; a tube pivotally connected to the lower end of said rod; and a pushing-toe having a shank fitted to slide in said tube and spring-pressed downwardly—said toe engaging and pushing said stoppers out of the delivery-chute upon the downward movement of the said rod.

16. In a bottle-stoppering machine for expanding stoppers of the character described; a feed device provided with a delivery-chute having in its rear side a keyhole-shaped slot to discharge imperfect stoppers; and a rail secured to each side of the said chute adjacent said slot and adapted to carry perfect stoppers over the same.

17. In a bottle-stoppering machine, the combination with a stopper-holder, of a feed device adapted to feed stoppers to said holder and comprising a rotary stopper-receptacle provided with outlet-openings; a delivery-chute adapted to receive the stoppers passed through said outlet-openings; a vertically-reciprocating pusher-foot provided with a toe adapted to engage and push the stoppers out of said delivery-chute; and a roller secured to said toe and riding on said chute.

18. In a bottle-stoppering machine the combination with a stopper-holder, of a feed device adapted to feed stoppers to said holder, and comprising a rotary stopper-receptacle provided with outlet-openings; a delivery-chute adapted to receive the stoppers passed through said outlet-openings; a vertically-reciprocating pusher-foot adapted to engage and push the stoppers out of said delivery-chute; and a ring, $d^8$, encircling said stopper-receptacle.

19. In a bottle-stoppering machine, the combination of a bottle-holder; stopper-expanding devices above said bottle-holder; a vertically-sliding stopper-holder adapted to hold a stopper below said expanding devices; and mechanism whereby the mouth of a bottle on said bottle-holder will raise said stopper-holder with respect to the expanding devices so as to bring the stopper and bottle-mouth into position for action by the expanding devices.

20. In a bottle-stoppering machine, the combination of a bottle-holder; stopper-expanding devices above said bottle-holder; a vertically-reciprocable downwardly-spring-pressed sliding stopper-holder mounted on said expanding devices and adapted to hold a stopper below said expanding devices; and mechanism whereby the mouth of a bottle on said bottle-holder will raise said stopper-holder with respect to the expanding devices so as to bring the stopper and bottle-mouth into position for action by the expanding devices.

21. In a bottle-stoppering machine, the combination of a bottle-holder; stopper-expanding devices above said bottle-holder; a vertically-reciprocable stopper-holder and bottle-mouth guide mounted on said expanding devices and adapted to hold a stopper below said expanding devices; and means whereby the mouth of a bottle on said bottle-holder will press against said guide and raise the latter and said stopper-holder, for the purpose set forth.

22. In a bottle-stoppering machine, the combination of stopper-expanding devices; a vertically-sliding stopper-holding tube mounted on said expanding devices and adapted to hold a stopper in proximity to the latter; and means for automatically releasing the stopper from said stopper-holding tube to allow it to drop into the mouth of a bottle.

23. In a bottle-stoppering machine, the combination with a stopper-holder, of a delivery-chute provided with a longitudinal slot, and having its discharge end located adjacent said holder; a stopper-receptacle adapted to pass stoppers into said chute; and a reciprocating pusher-foot working in said slot and adapted to engage the stoppers one at a time and push them into the stopper-holder.

24. In a bottle-stoppering machine, the combination with a stopper-holder provided with a side opening, of a delivery-chute provided with a longitudinal slot, and having its discharge end located adjacent said side opening; a stopper-receptacle adapted to pass stoppers into said chute; and a reciprocating pusher-foot working in said slot and adapted to engage the stoppers one at a time and push them through the side opening of the stopper-holder into the latter.

25. In a bottle-stoppering machine, the combination with a stopper-holder, of a delivery-chute whose discharge end is adjacent said holder; a stopper-receptacle adapted to pass stoppers into said chute; means for pushing the stoppers from the end of the chute into the stopper-holder; and a shunt device for discharging collarless stoppers from said chute at a point above the said end of the same.

26. In a bottle-stoppering machine, the combination of stopper-expanding fingers; and a vertically-sliding, downwardly-spring-pressed cylindrical casing, L, surrounding said fingers and serving as a bottle-mouth guide.

27. In a bottle-stoppering machine, the combination with a standard, of a bottle-holder mounted thereon; stopper-expanding devices also mounted thereon, and provided with a series of spring expanding-fingers and also provided with a wedge-pin adapted to move vertically between said expanding-fingers and having a wedge-shaped head adapted to spread said fingers apart; a rocking lever fulcrumed on said standard and provided with two arms, one of which is connected to said wedge-pin to move the latter; means operating upon the other arm of said lever whereby to rock the latter; and means for allowing said wedge-pin to yield whereby to limit or check the pressure of its head on said expanding-fingers.

28. In a bottle-stoppering machine, the combination with a standard, of a bottle-holder mounted thereon; stopper-expanding devices also mounted thereon above said bottle-holder, and provided with expanding-fingers and a wedge-pin adapted to spread said fingers apart; a rocking lever fulcrumed on said standard and provided with an arm which has an aperture through which the upper end of said wedge-pin loosely extends; a spring connected to said wedge-pin above said lever-arm and resting on the said arm whereby to suspend said wedge-pin; and means for rocking said lever.

29. In a bottle-stoppering machine, the combination with a standard, of a rocking lever, G, fulcrumed thereon; means for rocking said lever; and stopper-expanding devices provided with expanding-fingers and a wedge-pin movable vertically between said fingers and provided with a wedge-shaped head adapted to spread said fingers apart, the said wedge-pin being yieldingly suspended from said lever.

In testimony whereof we affix our signatures in the presence of two witnesses.

JOSEPH BUTKUS.
JOHN A. BUTKUS.

Witnesses:
THOS. C. BAILEY,
F. S. STITT.